United States Patent
Jacobson et al.

(10) Patent No.: US 12,447,651 B2
(45) Date of Patent: Oct. 21, 2025

(54) MOLDING METHODS FOR MAKING CHIRAL PARTS

(71) Applicant: Arris Composites Inc., Berkeley, CA (US)

(72) Inventors: Nataniel Jacobson, Alameda, CA (US); Isaiah De Leon, Emeryville, CA (US); Garrett Reed, Berkeley, CA (US); Marko Lolic, Alameda, CA (US)

(73) Assignee: Arris Composites Inc., Berkeley, CA (US)

( * ) Notice: Subject to any disclaimer, the term of this patent is extended or adjusted under 35 U.S.C. 154(b) by 233 days.

(21) Appl. No.: 18/206,983

(22) Filed: Jun. 7, 2023

(65) Prior Publication Data
US 2023/0390973 A1    Dec. 7, 2023

Related U.S. Application Data

(60) Provisional application No. 63/349,921, filed on Jun. 7, 2022.

(51) Int. Cl.
*B29C 43/18*    (2006.01)
*B29C 43/34*    (2006.01)
*B29L 31/50*    (2006.01)

(52) U.S. Cl.
CPC .............. *B29C 43/34* (2013.01); *B29C 43/18* (2013.01); *B29L 2031/50* (2013.01)

(58) Field of Classification Search
CPC ............ B29C 2043/147; B29C 43/203; B29C 2043/186; B29C 2043/184
See application file for complete search history.

(56) References Cited

U.S. PATENT DOCUMENTS 1,061,416 A * 5/1913 Small .................. A43B 13/12
                                                         12/146 B
1,173,449 A * 2/1916 Mansbach ............. A43D 35/00
                                                         12/21
(Continued)

FOREIGN PATENT DOCUMENTS

WO    2012/135007    10/2012
WO    2018/017890    1/2018

OTHER PUBLICATIONS

Authorized Officer Sabino Cianci, International Search Report and Written Opinion issued in PCT Patent Application No. PCT/US2023/024742 mailed on Sep. 6, 2023.

*Primary Examiner* — Matthew J Daniels
(74) *Attorney, Agent, or Firm* — Kaplan Breyer Schwarz, LLP (57) ABSTRACT

A method that enables the use of a single preform-charge fixture to create preform charges suitable for creating a chiral part and its mirror image is disclosed. The method utilizes a preform charge having a flat-planar form, unlike the near net shape preform charges used in applicant's legacy methods. Two identical instances of a preform charge are fabricated from the preform-charge fixture. The first instance of the preform charge is placed, in a first orientation, in a first compression mold for fabricating a first part. The second instance of the preform charge is placed, in a second orientation, in a second compression mold for fabricating the second part. The second orientation is obtained by rotating the second instance of the flat planar preform charge 180 degrees relative to the first orientation about an axis that is parallel to a reflection axis of the first and second instance of the preform charge.

8 Claims, 5 Drawing Sheets

(56) References Cited

U.S. PATENT DOCUMENTS

| | | | | |
|---|---|---|---|---|
| 1,396,185 | A | * | 11/1921 | Furber ................. C14B 5/00 |
| | | | | 83/29 |
| 2,232,767 | A | * | 2/1941 | Brophy ................ A43B 13/39 |
| | | | | 36/76 R |
| 4,134,955 | A | * | 1/1979 | Hanrahan, Jr. ...... B29D 35/061 |
| | | | | 425/129.2 |
| 4,372,525 | A | * | 2/1983 | Uhlig ..................... A43B 9/00 |
| | | | | 249/102 |
| 4,445,285 | A | * | 5/1984 | Phillips ............... A43B 13/146 |
| | | | | 36/71 |
| 10,800,115 | B2 | | 10/2020 | Escowitz et al. |
| 11,090,883 | B2 | | 8/2021 | Pelman et al. |
| 2004/0226191 | A1 | | 11/2004 | Hsieh |
| 2019/0299501 | A1 | | 10/2019 | Lin et al. |
| 2020/0114596 | A1 | | 4/2020 | Davidson et al. |
| 2021/0069998 | A1 | | 3/2021 | Escowitz et al. |
| 2021/0078267 | A1 | | 3/2021 | Bartel et al. |
| 2021/0279384 | A1 | | 9/2021 | Bahamonde Jacome et al. |
| 2021/0330024 | A1 | | 10/2021 | Guha et al. |

* cited by examiner

MOLDING METHODS FOR MAKING CHIRAL PARTS

STATEMENT OF RELATED APPLICATIONS

This specification claims priority of U.S. Pat. App. Ser. 63/349,921, filed Jun. 7, 2022, and incorporated by reference herein.

FIELD OF THE INVENTION

The present invention relates to molded materials, specifically methods and apparatuses for molding fiber-reinforced composite parts as well as the fiber-reinforced composite parts made using said methods and apparatuses.

BACKGROUND OF THE INVENTION

Composite materials, which have fibers embedded in a supporting matrix material, are used for fabricating strong yet lightweight parts. These composites have an attractive combination of properties, and provide significant manufacturing, performance, and economic advantages.

Applicant has disclosed the use of a preform charge as a feed structure for a compression-molding process to produce fiber-composite parts. The preform charge includes an arrangement of fiber-bundle-based preforms. Each preform consists of a bundle of co-aligned, resin-impregnated fibers, typically sourced from towpreg or the output of a resin-impregnation line. In addition to being cut to a desired size, each preform is usually specifically shaped. This provides an arrangement of preforms that fits the contours of a mold cavity in which it is to be placed, and to provide a desired fiber alignment throughout the mold. This alignment is maintained in the final part, and results in a part with superior mechanical properties.

The preform charge is typically created in a special fixture. The fixture has a structure suitable for arranging the preforms into a typically 3-dimensional form, which is usually very close to the shape/size of a part ("near-net shape") being molded. The fixture can include, for example, a plurality of cleats (for defining the arrangement of the preforms) and clamps that immobilize the arranged preforms. In some other embodiments, the fixture includes a cavity that dictates the how the preforms are arranged, and clamps for immobilization. Because the preforms usually have a round/oval cross section, and are typically stacked (to provide a 3-dimensional form), the clamps stabilize/immobilize the stack, as well as providing some minimal downward forward, and described below.

After being appropriately arranged by the fixture, the plurality of preforms are "tacked" together. The term "tacking" references heating to the point of softening (but not melting) to effectively join the preforms. Although tacking creates a unitary structure, the individual preforms retain aspects of their original form. In some cases, minimal compression, such as supplied by clamps, is applied for tacking operations. Because the resin in the preforms is not heated to liquefication (the preforms are typically heated to a temperature that is above the heat deflection temperature of the resin, but below the melting point), and the applied pressure is typically low (less than 100 psig and in some cases nothing more than the force of "gravity" acting on the preforms), the preform charge is not fully consolidated and thus could not function as a finished part. But joined in this fashion, the preforms will not move, thereby maintaining the desired geometry and the specific alignment of each preform in the assemblage. See, e.g., Publ. Pat. App. US2020/0114596 and U.S. Pat. No. 11,090,883, incorporated by reference herein.

Although the preform charge provides many advantages, it's fabrication requires the design, manufacture, and use of a specific preform-charge fixture. For certain types of finished parts—in particular, parts requiring two separate molds, wherein the molds are chiral—the use of a preform charge can be problematic.

Chirality is a property of asymmetry. An object is "chiral" if the object and its mirror image are not superimposable. Examples of chiral structures include, among others, certain anatomical features, such as the human hand, foot, and ear.

The following example illustrates the problem caused by chiral parts. Assume that a manufacturer must provide fiber-composite footbeds for a pair of sneakers. A different footbed is required for the left sneaker and the right sneaker. Two different molds are required, of course, to create these two footbeds. In a conventional compression-molding process, the feed constituents, usually plural sheets of fiber and resin, would be placed one-by-one into each of the molds forming a "lay-up" from which the part is molded. There is no use of a preform charge, and no preform-charge fixture is required.

Applicant's processes do, however, use a preform charge, which is created prior to molding operations. In the example of the fiber-composite footbeds, two distinct preform-charge fixtures are required; a first fixture to create the preform charge for the left footbed, and a second preform-charge fixture to create the preform charge for the right footbed. Hence, the use of a preform charge for such a part requires designing and fabricating two preform-charge fixtures with the associated expense. And consider that in the case of footwear, the footbeds must be produced in as many different sizes in which the sneakers are offered for sale. If the sneaker is offered in ten different sizes, twenty preform-charge fixtures—two for each size—would be required.

It would be beneficial to be able to use preform charges as feed constituents to make such a pair of chiral parts, but to do so via a preform-charge fabrication process that does not require two preform-charge fixtures.

SUMMARY

Embodiments of the present invention avoid the problem presented above, thereby improving manufacturing efficiency, reducing design and tooling requirements, and thereby costs. More particularly, some embodiments of the invention enable a single preform-charge fixture to create preform charges suitable for creating a chiral part and its mirror image. A non-limiting example of a chiral part made via an embodiment of the invention is a "left" footbed (for a left sneaker, shoe, etc.), and its mirror-image part—the "right" footbed (for the right sneaker, shoe, etc.).

Consider again the fabrication of fiber-composite footbeds, as discussed in the Background section. A right footbed and a left footbed are required. The lower surface of the human foot is contoured, and, as such, the footbeds must be correspondingly contoured. Applicant's preform charges have hitherto been formed as near-net shape structures. Consequently, using this legacy approach, the preform charges for forming the footbeds would be contoured (e.g., the arch, etc.), matching the contour of the final part.

Assume, for example, a preform-charge fixture is created that produces a preform charge for molding the right footbed. Because of the contoured nature of the "right" preform charge, it cannot simply be "flipped" over to create a preform charge suitable for molding the left footbed. The problem can be visualized by "mentally" flipping one's right foot over their left foot. Although the toes of the right foot will overlie the corresponding toes of left foot (such that the toes would be appropriately situated for creating a left footbed via this flipping motion), the bottom of the right foot (with its contoured surface) will be facing upward, rather than downward as would be required.

In accordance with the present teachings, the problem is solved by creating, from a single preform-charge tool, a preform charge that is used to form both a chiral part and its mirror-image part during molding. A key feature of the preform charge is its flat-planar form, which is unusual, since applicant's preform charge normally has a near-net shape. Rotating a preform charge that has an orientation for molding a right footbed, about an axis that is parallel to the reflection axis of the right-left footbed pair, results in a mirror-image orientation that enables that preform charge to be used to mold a left footbed.

In accordance with the illustrative embodiment, a method for creating a preform charge suitable for creating a chiral part and its mirror image, wherein the parts are contoured, comprises:
- designing a pair of parts, wherein the parts to be created include continuous fibers to the extent possible, spanning the major dimension of the parts;
- projecting the contoured surface of the first part onto a flat plane, wherein the form projected onto the flat plane becomes the basis for the design of an arrangement of preforms that are used to create the preform charge;
- calculating expected gaps resulting from pressing a flat arrangement of preforms onto a contoured surface (such as during molding operations);
- designing a flat preform arrangement that matches the projection of the contoured surface onto the flat plane, adding compensatory preforms as required to fill the resulting gaps (from pressing a flat arrangement onto a contoured surface during molding);
- placing the arrangement of preforms in a preform charge fixture;
- tacking the preforms together, thereby fabricating a first (flat-planar) preform charge; and
- repeating the previous two operations to fabricate a second (flat-planar) preform charge.

To form the chiral part and its mirror image:
- the first preform charge is placed into a mold for molding the first part, and is then compression molded to form the first part.
- the second preform charge is "flipped" or rotated 180 degrees about an axis that is parallel to a "reflection axis." In this context, the reflection axis is the axis across which the desired mirror image results.
- the second preform charge is placed, in the flipped/rotated orientation, into the mold for molding the second part, and then compression molded to form the second part.

In some embodiments, embodiments of the invention provide a method for fabricating a first contoured part and a second contoured part, wherein the first and second contoured parts are mirror images of one another, but exhibit chirality and are not superposable, the method comprising:
- fabricating a first instance of a flat-planar preform charge via a preform-charge fixture;
- placing the first instance of the preform charge in a first mold for use in molding the first contoured part, wherein the first instance of the preform charge has a first orientation in the first mold;
- compression molding the first contoured part;
- fabricating a second instance of the preform charge via the preform-charge fixture, wherein the second instance is identical to the first instance;
- placing the second instance of the preform charge in a second mold for use in molding the second contoured part, wherein the second instance of the preform charge has a second orientation in the second mold, wherein the second orientation is obtained by rotating the second instance of the preform charge 180 degrees relative to the first orientation about an axis that is parallel to a reflection axis of the first and second instance of the preform charge; and
- compression molding the second contoured part.

In some embodiments, embodiments of the invention provide a method for fabricating left and right footbeds for footwear, wherein the left and right footbeds are mirror images of one another, but exhibit chirality and are not superposable, the method comprising:
- fabricating a first instance of a flat-planar preform charge via a preform-charge fixture, the first instance having a shape corresponding to a right foot;
- placing, in a first orientation, the first instance of the preform charge in a first mold for molding the right footbed;
- compression molding the first instance of the preform charge to form the right footbed;
- fabricating a second instance of the flat-planar preform charge via the preform-charge fixture, the second instance having the shape corresponding to the right foot;
- placing, in a second orientation, the second instance of the preform charge in a second mold for molding the left footbed, wherein the second orientation is a mirror image of the first orientation; and
- compression molding the second instance of the preform charge to form the left footbed.

In some embodiments, embodiments of the invention provide a method for fabricating left and right footbeds for footwear, wherein the left and right footbeds are mirror images of one another, but exhibit chirality and are not superposable, the method comprising:
- fabricating a first instance of a flat-planar preform charge via a preform-charge fixture, the first instance having a shape corresponding to a left foot;
- placing, in a first orientation, the first instance of the preform charge in a first mold for molding the left footbed;
- compression molding the first instance of the preform charge to form the left footbed;
- fabricating a second instance of the flat-planar preform charge via the preform-charge fixture, the second instance having the shape corresponding to the left foot;
- placing, in a second orientation, the second instance of the preform charge in a second mold for molding the right footbed, wherein the second orientation is a mirror image of the first orientation; and
- compression molding the second instance of the preform charge to form the right footbed.

DETAILED DESCRIPTION

Definitions. The following terms are defined for use in this description and the appended claims:

"Fiber" means an individual strand of material. A fiber has a length that is much greater than its diameter.

"Fiber bundle" means plural (typically multiples of one thousand) co-aligned fibers.

"Stiffness" in the context of a material means resistance to bending, as measured by Young's modulus. When used in the context of a spring or spring assembly, "stiffness" means resistance to displacement from an unstretched/uncompressed state.

"Tow" means a bundle of fibers (i.e., fiber bundle), and those terms are used interchangeably herein unless otherwise specified. Tows are typically available with fibers numbering in the thousands: a 1K tow (1000 fibers), 4K tow (4000 fibers), 8K tow, etc.

"Prepreg" means fibers that are impregnated with resin.

"Towpreg" means a fiber bundle (i.e., a tow) that is impregnated with resin.

"Preform" means a segment of plural, co-aligned, resin-impregnated, typically same-length fibers. The segment is cut to a specific length, and, in many cases, will be shaped (e.g., bent, twisted, etc.) to a specific form, as appropriate for the specific part being molded. Preforms are usually sourced from towpreg (i.e., the towpreg is sectioned to a desired length), but can also be from another source of plural co-aligned, unidirectionally aligned fibers (e.g., from a resin impregnation process, etc.). Preforms are preferably, but not necessarily, substantially circular or oval in cross section. Applicant's use of the term "preform" explicitly excludes any size of shaped pieces of: (i) tape/ribbon, (ii) sheets of fiber, and (iii) laminates. The modifier "fiber-bundle-based" or "aligned-fiber" may be prepended herein to the word "preform" to emphasize the nature of applicant's preforms and to distinguish them from prior-art preforms, which are typically in the form of tape/ribbon, sheets, or shapes cut from sheets of fiber.

"Preform Charge" means an assemblage of preforms that are at least loosely bound together (i.e., tacked) to maintain their position relative to one another. Preform charges can contain fiber in form factors other than that of fiber bundles, and can contain various inserts, passive or active. Preform charges are not fully consolidated.

"Preform Layup" means an arrangement of individual preforms that is formed by placing preforms, one-by-one, into a mold cavity. A preform layup is distinguished from a preform charge, wherein for the latter, the preforms are at least loosely bound to one another and the assemblage thereof is usually formed outside of the mold cavity.

"Compatible" means, when used to refer to two different resin materials, that the two resins will mix and bond with one another.

"Compression molding" is a molding process that involves the application of heat and pressure to feed constituents. These constituents are typically placed in a female mold portion having a mold cavity. As the requisite amount of feed constituents are placed in the female mold portion, a second mold portion—a male mold portion—is joined to the female mold portion to close the mold cavity. The male mold portion usually includes features that extend into the female mold portion to engage the feed constituents therein. For applicant's processes, the pressure applied to the feed constituents is usually in the range of about 1000 psi to about 5000 psi, and temperature, which is a function of the resin being used, is typically in the range of about 150° C. to about 400° C. Once the applied heat has increased the temperature of the resin above its melt temperature, it is no longer solid and will flow. The resin will then conform to the mold geometry via the applied pressure, and the feed constituents are thereby consolidated, resulting in a nascent part having very little void space. Elevated pressure and temperature are typically maintained for a few minutes. After this compression molding protocol is complete, the mold is cooled and removed from the source of pressure. A finished part is removed from the mold.

"Consolidate", "consolidating", or "consolidation" means, in the present context, that in a grouping of fibers/resin, such as plurality of preforms, void space is removed to the extent possible and as is acceptable for a final part. Feed structures lose any unique or individual identity and any previously existing boundaries between adjacent preforms are lost. This requires significantly elevated pressure, either via gas pressurization (or vacuum), or the mechanical application of force (e.g., rollers, etc.), and elevated temperature (to soften/melt the resin).

"Partial consolidation" means, in the present context, that in a grouping of fibers/resin, void space is not removed to the extent required for a final part. As an approximation, one to two orders of magnitude more pressure is required for full consolidation versus partial consolidation. As a further very rough generalization, to consolidate fiber composite material to about 80 percent of full consolidation requires only 20 percent of the pressure required to obtain full consolidation.

"Neat" resin or other matrix material means that the resin/matrix material is devoid of reinforcing fibers.

"About" or "Substantially" means +/−20% with respect to a stated figure or nominal value.

Other definitions may be provided elsewhere in this specification, in context.

It is to be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. As a non-limiting example, a recited range of "1 to 10 µm" includes "5 to 8 µm", "1 to 4 µm", "2 to 9 µm", etc.

Feed Constituents. The basic feed constituent used with the methods disclosed herein is the fiber-bundle-based preform (hereinafter "preform"). A preform is typically "formed" from towpreg, but may also be sourced from the output of a resin impregnation line. To form a preform from towpreg (or the output of a resin infusion line), the towpreg is cut into segments of a desired size and often shaped (e.g., bent, etc.) as well. Each preform include thousands of co-aligned, resin-infused fibers, typically in multiples of one thousand (e.g., 1 k, 10 k, 24 k, etc.). A preform may have any suitable cross-sectional shape (e.g., circular, oval, trilobal, polygonal, etc.), but is most typically circular or oval.

The individual fibers within a preform can have any diameter, which is typically, but not necessarily, in a range of 1 to 100 microns. The individual fibers can have any length, which is application specific, wherein the length results from the cutting operation that creates the associated preform. Individual fibers can include an exterior coating such as, without limitation, sizing, to facilitate processing, adhesion of binder, minimize self-adhesion of fibers, or impart certain characteristics (e.g., electrical conductivity, etc.).

Each individual fiber can be formed of a single material or multiple materials (such as from the materials listed below), or can itself be a composite. For example, an individual fiber can comprise a core (of a first material) that is coated with a second material, such as an electrically conductive material, an electrically insulating material, a thermally conductive material, or a thermally insulating material.

In terms of its composition, each individual fiber can be, for example and without limitation, carbon, carbon nanotubes, glass, natural fibers, aramid, boron, metal, ceramic, polymer, synthetic fibers, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), aluminasilicate, calcium silicate, rock wool, boron nitride, silicon carbide, and combinations of any of the foregoing. Non-limiting examples of suitable synthetic fibers include nylon (polyamides), polyester, polypropylene, meta-aramid, para-aramid, polyphenylene sulfide, and rayon (regenerated cellulose).

Any resin—thermoplastic or thermoset—that bonds to itself under heat and/or pressure can be used in conjunction with embodiments of the invention.

Exemplary thermoplastic resins useful in conjunction with embodiments of the invention include, without limitation, acrylonitrile butadiene styrene (ABS), ethylene tetrafluoroethylene (ETFE), fluorinated ethylene propylene (FEP), liquid crystal polymers (LCPs), polyamides (Nylon), polyaryletherketones (PAEK), polybenzimidazole (PBI), polybutylene terephthalate (PBT), polycarbonates (PC), and polycarbonate-ABS (PC-ABS), polyethylene (PE), polyetheretherketone (PEEK), polyetherimide (PEI), polyether sulfones (PES), polyethylene terephthalate (PET), perfluoroalkoxy copolymer (PFA), polyimide (PI), polymethylmethacrylate (PMMA), polyoxymethylene (polyacetals) (POM), polypropylene (PP), polyphosphoric acid (PPA), polyphenylene ether (PPE), polyphenylene oxide (PPO), polyphenylene sulfide (PPS), polyphenylsulfone (PPSU), Polystyrene (PS), polysulfone (PSU), polytetrafluoroethylene (PTFE), polyurethane (PU), polyvinyl chloride (PVC), styrene acrylonitrile (SAN), and styrene butadiene styrene (SBS). A thermoplastic can be a thermoplastic elastomer such as polyurethane elastomer, polyether ester block copolymer, styrenic block copolymer, polyolefin elastomer, polyether block amide, thermoplastic olefins, elastomeric alloys (TPE and TPV), thermoplastic polyurethanes, thermoplastic copolyesters, thermoplastic polyamides, and thermoplastic silicone vulcanizate.

Non-limiting examples of suitable thermosets include araldite, bakelites, epoxies, melamines, phenol/formaldehydes, polyesters, polyhexahydrotriazines, polyimides, polyisocyanates, polyureas, silicones, urea/formaldehydes, vinyl esters, phenolics, and polycarbonates. Suitable thermosets can be prepared as a partially cured B-stage.

For use in conjunction with the invention, the preforms are organized into preform charge, having a flat-planar form factor.

Figure 1:
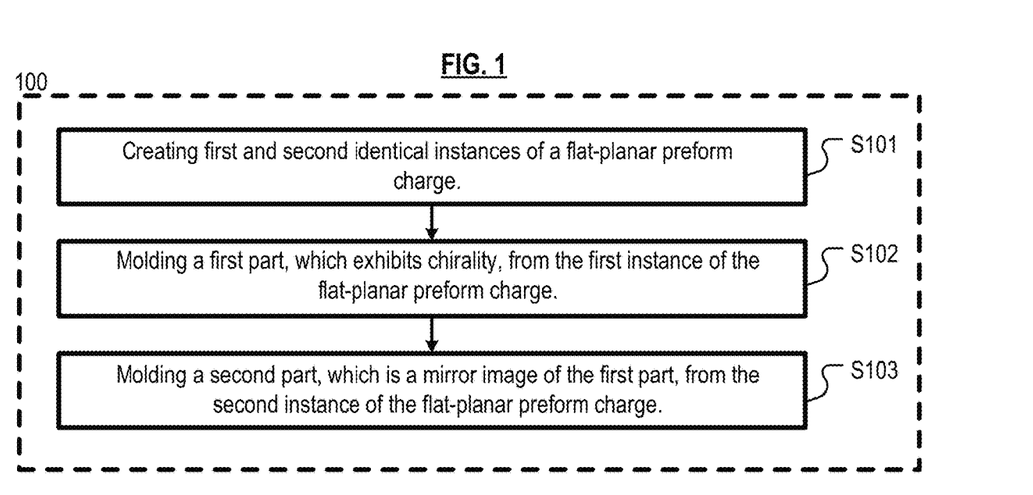
FIG. 1 depicts a method in accordance with the present teachings for molding a part that exhibits chirality, and the part's mirror image.

FIG. 1 depicts method 100 in accordance with the present teachings for creating two chiral parts having contoured surfaces; more specifically, a chiral part and its mirror image.

In accordance with operation S101, two identical instances of a preform charge from which the two parts are to be molded, are created. In accordance with embodiments of the invention, the preform charges have a flat-planar form, and are created from a single preform-charge fixture. As described further below in conjunction with the FIG. 2, the preform charge, which has a specific arrangement of preforms, is designed based on requirements of the part ultimately being formed (e.g., mechanical and aesthetic specifications, the external forces to which the part is subjected to when in use, etc.). Once the design of the preform charge is established, a preform-charge fixture for creating the preform charge is designed and fabricated.

In accordance with operation S102, the first part is fabricated from the first (identical) instance of the preform charge. This operation is described in further detail in conjunction with FIG. 4. In operation S103, the second part is fabricated from the second (identical) instance of the preform charge. This operation is described in further detail in conjunction with FIG. 5.

Figure 2:
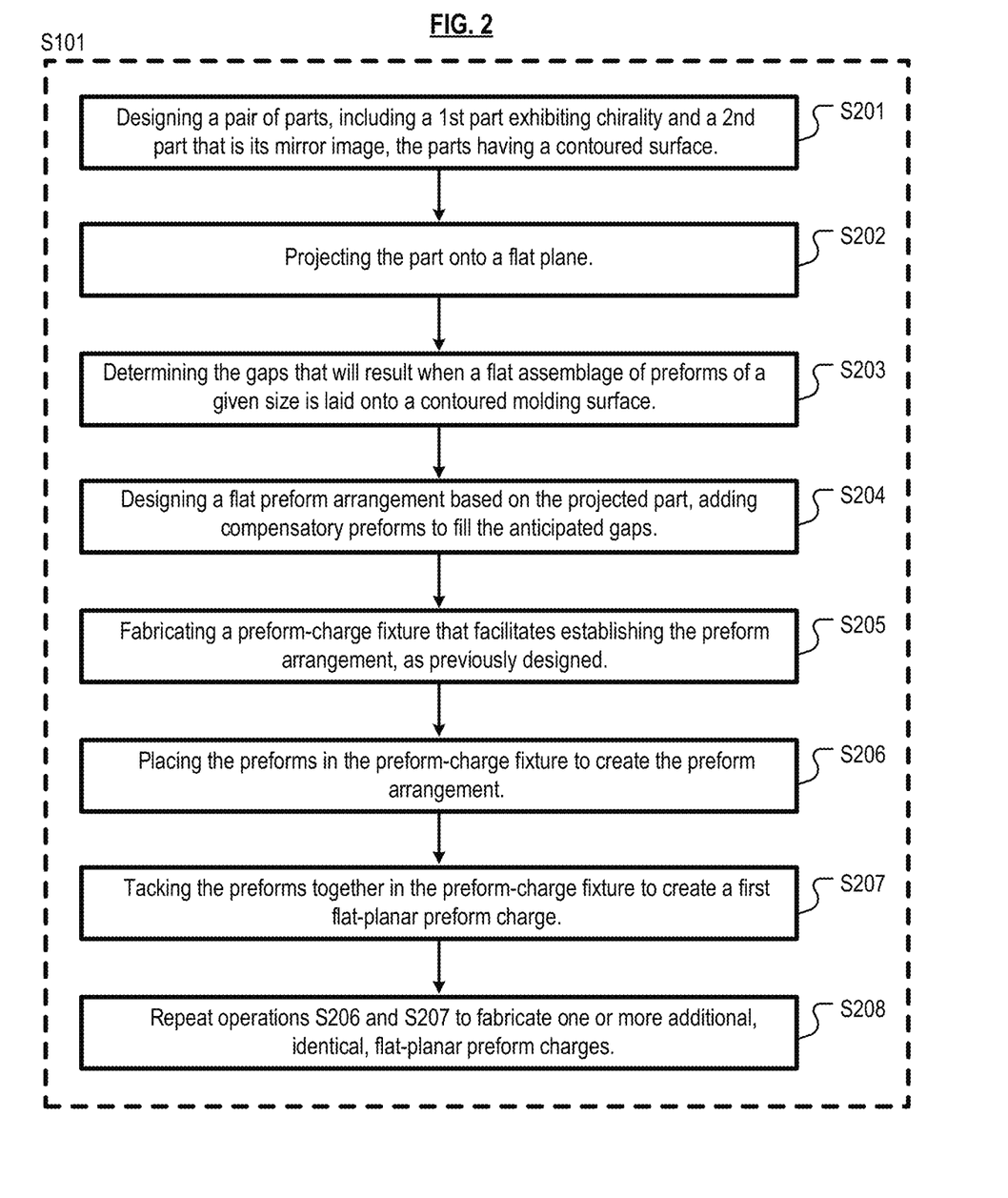
FIG. 2 depicts a method in accordance with the present teachings for accomplishing one of the operations of the method of FIG. 1.

FIG. 2 depicts a method for accomplishing operation S101; that is, creating two identical instances of a preform charge from which the chiral part, and its mirror image, are molded.

In accordance with operation S201, the chiral part and its mirror image are designed. Typically, the design is based on (1) the required overall physical attributes of the part, notably its size and shape, as well as (2) the mechanical specification and the anticipated in-use loads to which the part will be subjected. Consideration (2) provides an ideal fiber alignment for the part. The fiber alignment can be determined via the methods described in U.S. Pat. No. 10,800,115, U.S. Publ. Pat. Apps. 2021/0069998 and 2021/0279384, all of which are incorporated herein by reference.

In operation S202, the part is projected onto a flat plane. In the case, for example, of a footbed, this involves projecting all the rib-like structures and the perimeter of the footbed onto a flat plane. The form that is projected becomes the basis for the design of the preform charge (i.e., the arrangement of preforms) and the preform-charge fixture. The projection may be accomplished, for example, using a CAD program. Any CAD program will have a feature to project an object onto a flat plane, thereby creating a sketch of the object's "shadow." This sketch is then used as a basis for the design of the preform charge, as well as the design of the cavity geometry (or cleat layout) for the preform charge fixture that is used to fabricate the preform charge.

In operation S203, the gaps that will result from pressing a flat-planar preform charge onto a contoured surface (i.e., during compression-molding operations) are calculated.

With respect to the previous two operations, when an arc is projected onto a flat plane, the length of the projected image will be shorter than the arc length. (See step S202.) Consequently, when a flat planar layup of preforms (i.e., preform charge), which is sized based on the projection of a contoured part surface, is pressed onto the contoured (mold) surface, the layup will be too short to fully cover the contoured surface, resulting in "gaps." (See step S203.)

Figure 3A:
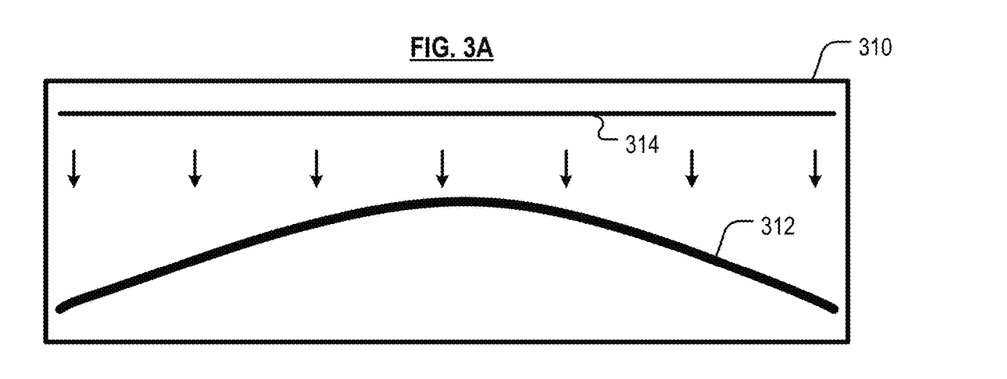
FIGS. 3A and 3B illustrates the pressing of a flat-planar preform charge onto a contoured surface, as occurs while molding the part exhibiting chirality, and its mirror image, in accordance with the present teachings.
Figure 3B:
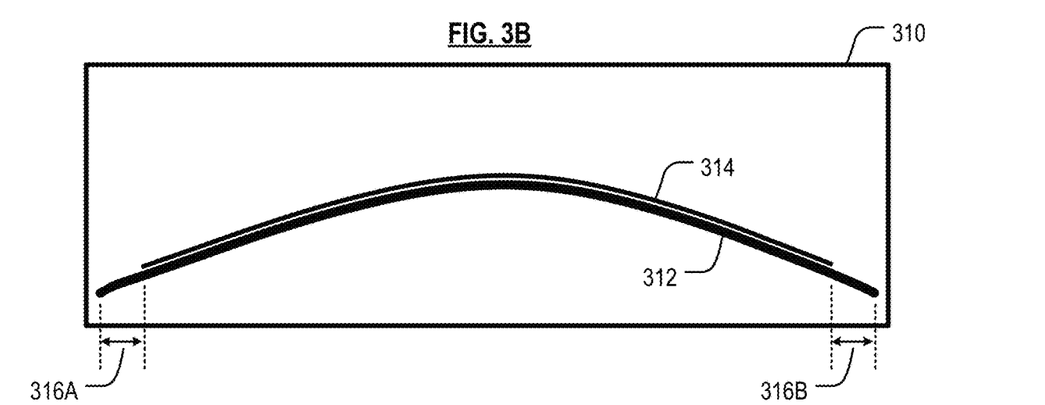

FIGS. 3A and 3B illustrate the gaps referenced in operation S203. FIG. 3A depicts a simplified mold 310, including contoured surface 312 onto which flat-planar preform charge 314 is to be pressed to impress the contour onto the finished part. It will be appreciated that since the end points of both contoured surface 312 and preform charge 314 extend the same horizontal distance, the spline length of contoured surface 312 is greater than the length of linear preform charge 314. FIG. 3B depicts gaps 316A and 316B that result when preform charge 314 is pressed against contoured surface 312 (a slight gap between the preform charge and the contoured surface is shown for clarity of illustration). The pressing operation is accomplished by a plunger or appropriately shaped male feature extending from the male portion (not depicted) of mold 310. Although gaps 316A and 316B are depicted at the left and right ends contoured surface 312, it will be appreciated that as a function of the specifics of the contour, gaps may appear at other locations as well.

Per operation S204, a flat preform arrangement is developed based on projection of the part obtained in operation S202. The ideal fiber alignment determined in operation S201 is modified, as appropriate, consistent with fabrication-related constraints, see, e.g., U.S. Pat. No. 10,800,115. Examples of constraints applicable to preforms, include, without limitation, maximizing the number of straight (unbent) preforms (faster production), minimizing the number of unique bend radii (reduces process variability), maximizing the length of the preforms (longer is stronger), etc.

To account for the gaps that arise when impressing contours onto the flat-planar preform charge during molding, compensatory preforms are added to the preform arrangement (beyond what is required based on the projection of the part). This is can be done by lengthening preforms that are near to the gaps, or simply adding preforms to fill the gap(s). In some cases, short preforms (less than 40 mm) are added to the arrangement of preforms; the fibers from such preforms will preferentially flow to the gaps along with the liquefied resin during molding, since pressure will be lower in such (empty) regions. The gaps can be calculated based on:
  absolute dimensions of the gap (length, width, height);
  a percentage of the adjacent section;
  volume;
  the number of pre-dimensioned preforms that must be added to fill the gap;
  the number, length, or volume of short preforms (having "flowable" fibers) that are placed in adjacent sections.

In operation S205, a preform-charge fixture for creating the flat-preform arrangement determined in operation S204 is fabricated. In some embodiments, the preform-charge fixture includes a plurality of cleats/posts that are positioned to facilitate creating the preform arrangement. That is, placing the preforms against the cleats creates the desired preform arrangement. Alternatively, a cavity having the appropriate size and shape is created, and preforms are placed therein. Clamps are typically included in both types of fixtures.

In operation S206, the preforms are placed in the preform-charge fixture. Clamps stabilize the preforms and apply minimal pressure thereto (typically less than 100 psig).

Per operation S207, the preforms are tacked together. For preforms containing thermoplastic resin, this is accomplished by heating the resin above its heat deflection temperature, but below its melt temperature. The elevated temperature and applied pressure cause the preforms to adhere to one another. Although the result is a single mass of preforms, the preforms retain their individuality and, importantly, their orientation relative to one another. The arrangement of preforms is then cooled, creating a preform charge.

In operation S208, operations S206 and S207 are repeated to fabricate a second flat-planar preform charge that is identical to the first preform charge.

Figure 4:
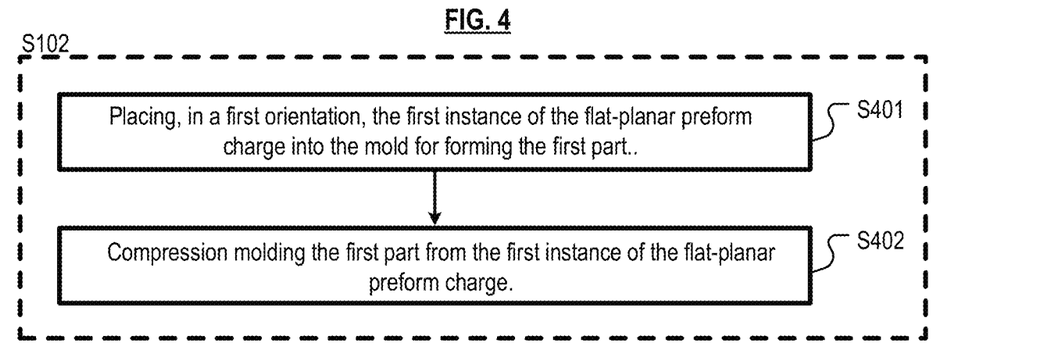
FIG. 4 depicts a method in accordance with the present teachings for accomplishing a second of the operations of the method of FIG. 1.

Returning to FIG. 1, operation S102 recites molding a first part, which exhibits chirality, from the first instance of the flat-planar preform charge. FIG. 4 depicts a method for preforming operation S102. Per operation S401, a first instance of the flat-planar preform charge is placed into a mold for fabricating the first part. The preform charge is placed in the mold in a first orientation. In accordance with operation S402, the first part is fabricated by compression molding the first instance of the preform charge.

Figure 5:
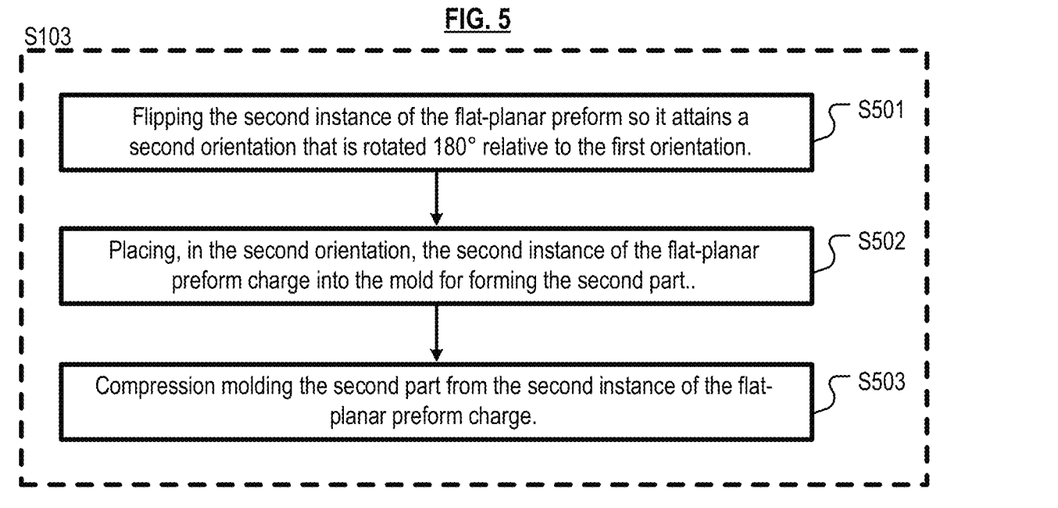
FIG. 5 depicts a method in accordance with the present teachings for accomplishing a third of the operations of the method of FIG. 1.

With continuing reference to FIG. 1, in operation S103, the second part, which is a mirror image of the first part, is molded. FIG. 5 depicts a method for preforming operation S103. Per operation S501, a second instance of the flat-planar preform charge is flipped or rotated 180 degrees, relative to the first orientation, about an axis that is parallel to what would be the "reflection axis" of the first part-second part pairing. (See, e.g., FIG. 6B.) Per operation S502, the second instance of the preform charge is placed in the mold in the second orientation. In accordance with operation S503, the second part is fabricated by compression molding the second instance of the preform charge.

Figure 6A:
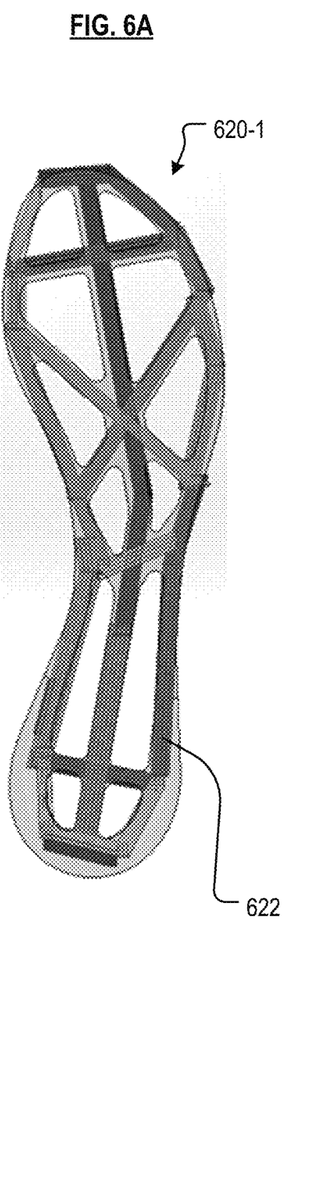
FIG. 6A depicts a preform charge for forming the part exhibiting chirality.

FIG. 6A is an example of a flat-planar preform charge for fabricating a fiber-composite footbed in accordance with an embodiment of the invention. Preform charge 620-1 consists of an arrangement of preforms 622. In this example, all preforms 622 are linear. The preforms are as long as possible, consistent with the use of linear (i.e., no bends) preforms. With the orientation shown in FIG. 6A, preform charge 620-1 is placed into the mold for creating the "right" footbed.

Figure 6B:
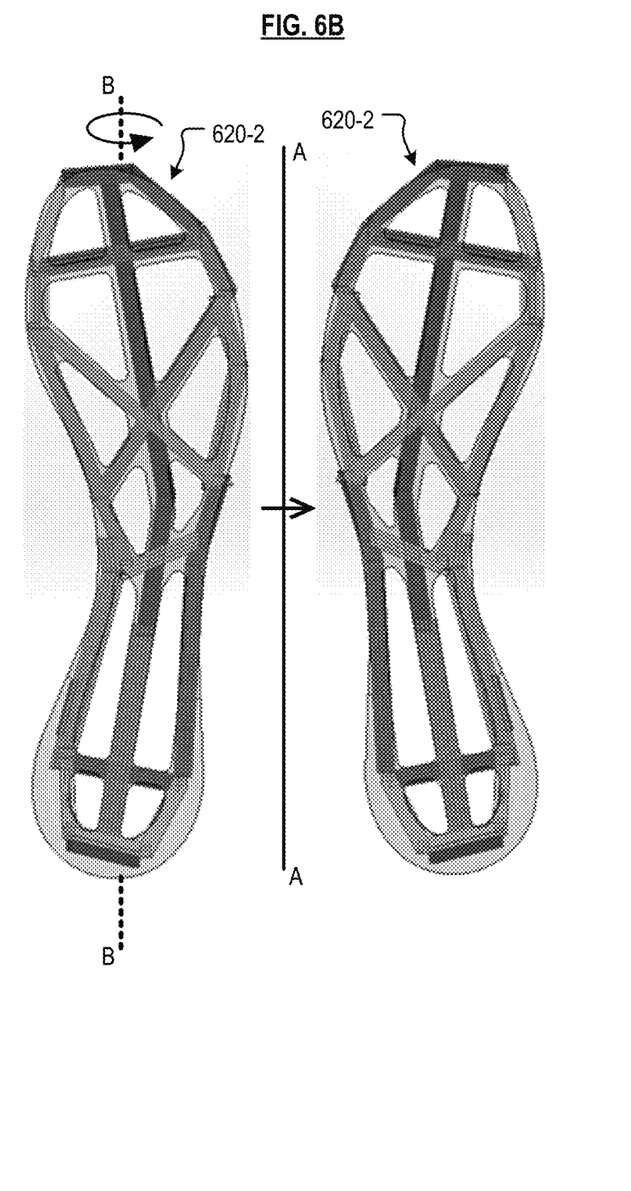
FIG. 6B depicts a preform charge identical to the preform charge of FIG. 6A, and illustrates a flipping operation in accordance with the present teachings.

Referring now to FIG. 6B, to create the left footbed, another instance of the same preform charge—preform charge 620-2—is required. In accordance with the present teachings, preform charge 620-2 is rotated 180 degrees about an axis—axis B-B—that is parallel to the "reflection axis" A-A. In this context, the reflection axis is the axis "separating" the mirror-imaged preform charges. As shown, this rotation results in a second orientation for the preform charge; namely a "left" foot orientation.

Once this second (left-footed, in this case) orientation is established, the preform charge is placed into the mold for the left footbed. Because preform charge 620 has a flat-planar form, in accordance with the present teachings, it can be flipped as shown to create the requisite two orientations for the right-foot and left-foot molds.

It is notable that in some embodiments, a modified compression molding process is used to compression mold the preform charges (steps S102 and S103). If a flat-planar preform charge were pressed (e.g., via a plunger, etc.) against the contoured surface of the mold, the relatively rigid preforms might snap under the applied force. In some embodiments, the male mold part (e.g., plunger, etc.) is brought into contact with the preform, applying only minimal force thereto. The mold is then heated to an intermediate temperature, such as just above the glass transition temperature $T_g$ of the resin in the preform charge. As the resin in the preform charge softens, the plunger applies increased force to the preform charge, conforming it to the contoured surface of the mold cavity. The temperature is ultimately raised to the melt temperature $T_m$ of the resin to achieve the melt-flow state, and pressure is raised (c.a. 1000-5000 psi) to consolidate the resin and fibers in the preform charge. After a brief hold (up to a few minutes) at pressure and temperature, the mold is cooled and then depressurized.

Figure 7:
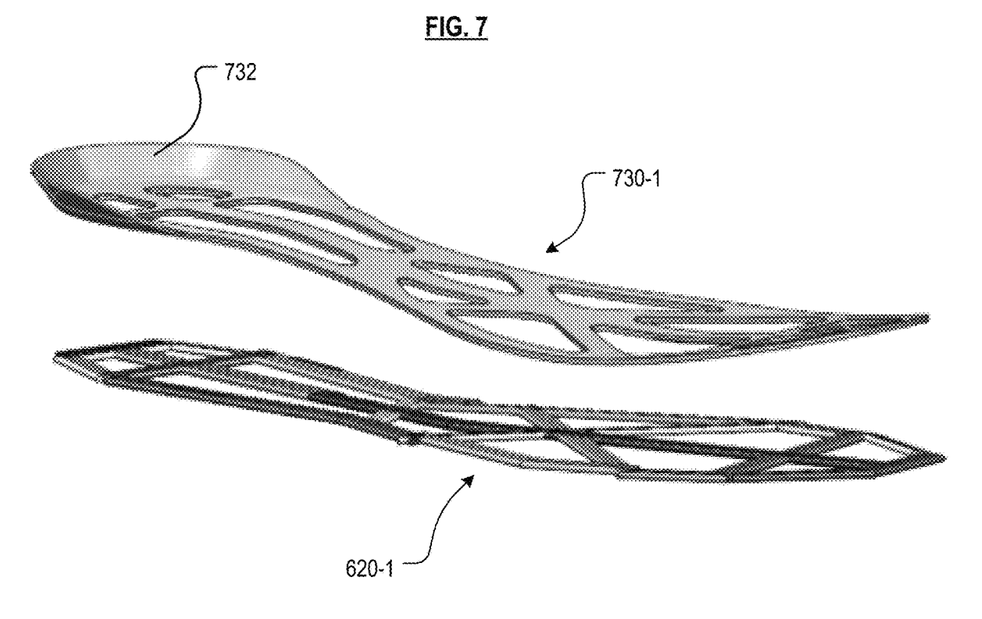
FIG. 7 depicts the preform charge of FIG. 6A, and a part that exhibits chirality formed therefrom.

FIG. 7 depicts fiber composite footbed 730-1, having contours as shown, produced from flat-planar preform charge 620-1. By virtue of the flat-planar form of the preform charge, only a single preform-charge design is required to fabricate both (chiral) parts.

Region 732 is "out-of-plane" relative to the major surface of fiber-composite footbed 730-1. This region is formed by extending the preforms in that region of the preform charge, or providing sufficiently short preforms (less than 40 mm) to ensure that the fibers therefrom will flow to that region during molding operations.

It is to be understood that the disclosure describes a few embodiments and that many variations of the invention can easily be devised by those skilled in the art after reading this disclosure and that the scope of the present invention is to be determined by the following claims.

What is claimed:

1. A method for fabricating a first part and a second part, wherein the first and second parts are mirror images of one another, but exhibit chirality and are not superposable, the method comprising:
    designing the first part, the first part having a shape and a first size;
    designing a flat-planar preform charge, the flat-planar preform charge having a shape and second size that is based on a planar projection of the first part, wherein the second size is smaller than the first size;
    fabricating a first instance of the flat-planar preform charge via a preform-charge fixture;
    placing the first instance of the preform charge in a first mold for use in molding the first contoured part, wherein the first instance of the preform charge has a first orientation in the first mold;
    compression molding the first part;
    fabricating a second instance of the preform charge via the preform-charge fixture, wherein the second instance is identical to the first instance;
    placing the second instance of the preform charge in a second mold for use in molding the second part, wherein the second instance of the preform charge has a second orientation in the second mold, wherein the second orientation is obtained by rotating the second instance of the preform charge 180 degrees relative to the first orientation about an axis that is parallel to a reflection axis of the first and second instance of the preform charge; and
    compression molding the second part.

2. The method of claim 1 wherein the step of designing the flat-planar preform charge comprises generating the planar projection via a CAD program.

3. The method of claim 1 wherein compression molding the first part comprises pressing the first instance of the preform charge against a contoured surface in the first mold after the first instance of the preform charge is heated to at least a heat deflection temperature of a resin in the first instance of the preform charge.

4. The method of claim 1 wherein the first part is a footbed for a right-foot item of footwear, and the second part is a footbed for a left-foot item of footwear.

5. The method of claim 1 wherein fabricating the first instance of the preform charge comprises tacking together a plurality of fiber-bundle-based preforms.

6. A method for fabricating a first contoured part and a second contoured part, wherein the first and second contoured parts are mirror images of one another, but exhibit chirality due to contours and are therefore not superposable, the method comprising:
    designing the first contoured part, the first contoured part defined by a plurality of ribs;
    generating a flat-planar representation of the first contoured part;
    designing a flat-planar preform charge in accordance with the flat-planar representation;
    fabricating a first instance of the flat-planar preform charge by tacking together a plurality of fiber-bundle-based preforms, wherein a location and orientation of the fiber-bundle-based preforms correspond to a location and orientation of the plurality of ribs in the flat-planar representation of the first contoured part;
    placing the first instance of the flat-planar preform charge in a first mold for use in molding the first contoured part, wherein the first instance of the preform charge has a first orientation in the first mold;
    compression molding the first part;
    fabricating a second instance of a flat-planar preform charge, wherein the second instance is identical to the first instance thereof;
    placing the second instance of the flat-planar preform charge in a second mold for use in molding the second contoured part, wherein the second instance of the flat-planar preform charge has a second orientation in the second mold, wherein the second orientation is obtained by rotating the second instance of the flat-planar preform charge 180 degrees relative to the first orientation about an axis that is parallel to a reflection axis of the first and second instances of the flat-planar preform charge; and
    compression molding the second contoured part.

7. The method of claim 6 wherein the first contoured part is a footbed for a right-foot item of footwear, and the second contoured part is a footbed for a left-foot item of footwear.

8. A method for fabricating a first contoured part and a second contoured part that are mirror images of one another, but that exhibit chirality and are therefore not superposable, the method comprising:
    designing the first contoured part, the design including a plurality of fiber-bundle-based preforms organized as an arrangement of ribs;
    generating a flat-planar representation of the first part;

designing a flat-planar preform charge in accordance with the flat-planar representation;

fabricating a first instance of a flat-planar preform charge by tacking together a plurality of fiber-bundle-based preforms in accordance with the arrangement of ribs in the flat-planar representation;

fabricating the first contoured part by compression molding the first instance of the flat-planar preform charge in a first mold, wherein the first instance of the preform charge has a first orientation in the first mold;

fabricating a second instance of a flat-planar preform charge, wherein the second instance is identical to the first instance thereof;

fabricating the second contoured part by compression molding the second instance of the flat-planar preform charge in a second mold, wherein the second instance of the flat-planar preform charge has a second orientation in the second mold, wherein the second orientation is obtained by rotating the second instance of the flat-planar preform charge 180 degrees relative to the first orientation about an axis that is parallel to a reflection axis of the first and second instances of the flat-planar preform charge.

* * * * *